March 1, 1949. L. S. BIALKOWSKI 2,463,237
LOCK
Filed May 14, 1946 2 Sheets-Sheet 1
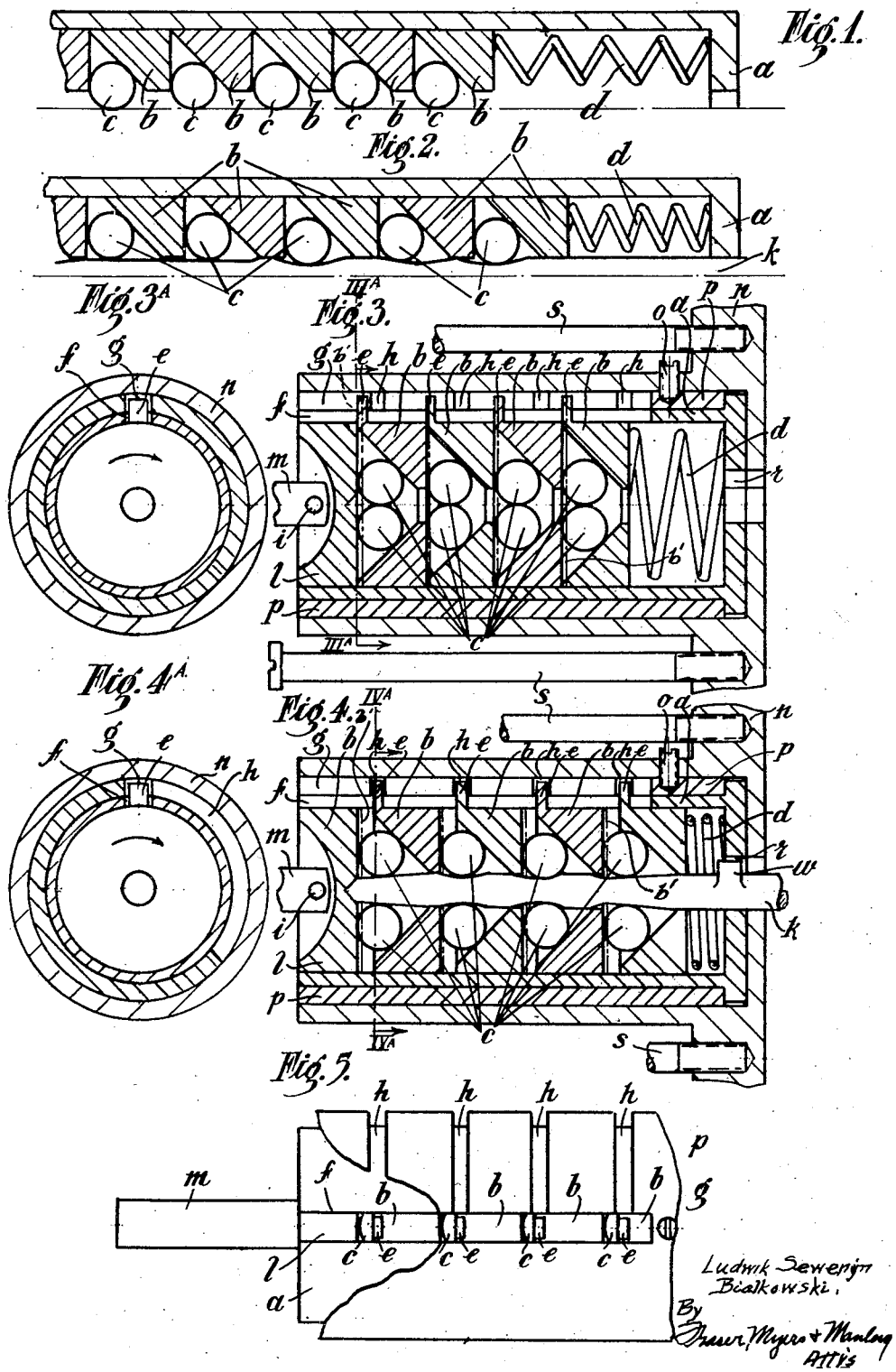

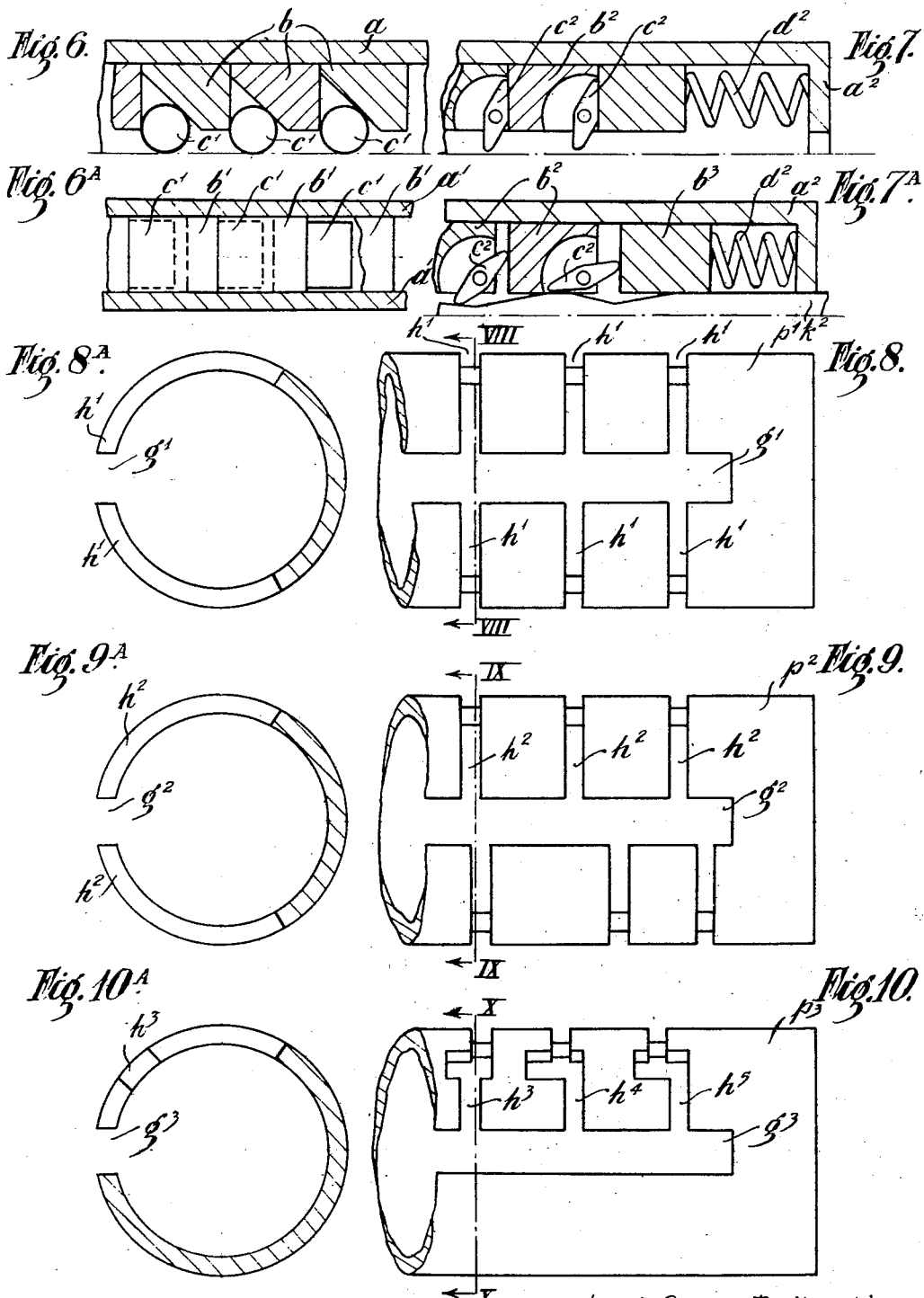

Patented Mar. 1, 1949

2,463,237

UNITED STATES PATENT OFFICE 2,463,237

LOCK

Ludwik Seweryn Bialkowski, London, England

Application May 14, 1946, Serial No. 669,685
In Great Britain May 24, 1945

8 Claims. (Cl. 70—363)

1

This invention relates to locks and has for its object to provide improvements therein.

In accordance with the present invention, I provide a lock comprising a combination axially movable members and radially movable members and means whereby on the insertion of a key of suitable profile the radially movable members are moved outwardly to move the axially movable members in an axial direction, from the locked to the unlocked position, an axial move of any of the axially movable members being the sum of the moves of all preceding axially movable members counting from the end of the lock opposite the end at which the key is inserted, in addition to the axial move forced on the said axially movable members by the radial move of its radially movable members.

The invention also comprises a lock comprising in combination, a sleeve member formed with a longitudinal slot and at least one arcuate peripheral slot connected therewith, at least one axially movable member in said sleeve, a projection on said axially movable member adapted operatively to engage with said slot arrangement in said sleeve member, at least one radially movable member positioned in operative relationship relative to said axially movable member, and means whereby on the insertion of a key of suitable profile the radial movable member moves outwardly to cause axial movement of the axially movable member to bring the said projection into register with the said arcuate slot on said sleeve member to allow the rotation of said axially movable member.

Various forms of lock made in accordance with the present invention are illustrated in the accompanying drawings, wherein:

Figs. 1 and 2 are part sectional elevations showing the general principle of operation of the axially and radially movable members and spring device in two positions.

Fig. 3 is a sectional elevation before the insertion of the key in the lock.

Fig. 4 is a sectional elevation after the insertion of the key in the lock.

Figs. 3a and 4a are respectively cross-sections in lines IIIa and IVa Figs. 3 and 4 with the balls removed looking in the direction of the arrows.

Fig. 5 is a broken plan with the lock casing removed.

Fig. 6 is a vertical section of a modification employing rollers.

Fig. 6a is a section at right angles to Fig 6.

Figs. 7 and 7a are vertical sections of a modification employing levers respectively before and after insertion of a key.

Figs. 8, 9 and 10 illustrate modified ways of slotting the sleeve.

Figs. 8a, 9a, 10a, are sections on lines VIII—VIII, IX—IX,—X—X respectively in Figs. 8, 9, and 10.

A rotatable socket $a$ houses axially movable members $b$ and radially movable members in the shape of balls $c$ seated in conical recesses between members $b$ and a locking piece $l$ and in radial grooves $b'$ in the faces of the members $b$ remote from the conical recesses. A spring $d$ keeps all the movable members $b$, $b$, $b$, $b$, and the balls $c$ in the position, as shown in Figs. 1 and 3. Each of the axial members $b$ is provided with a tooth $e$, protruding out of the socket $a$ through a longitudinal slot $f$ in the socket $a$. The said tooth $e$ prevents the axially movable members $b$ turning inside the socket $a$ but allows the axial movement of the said members $b$.

The teeth $e$ of the axially movable members $b$ protrude out of the slot $f$ so that a substantial amount of the teeth surface engages a longitudinal slot $g$, similar to slot $f$, in a fixed sleeve $p$, annularly slotted at $h$, to prevent the turning of the socket $a$ inside of the fixed sleeve $p$ until the teeth enter the annular slots $h$, that is to say, when the lock is locked.

A pin $i$ (Figs. 3 and 4) passes through the socket $a$, the locking piece $l$ and a connecting rod $m$, for withdrawing the lock bolt.

The socket $a$ is placed inside the sleeve $p$ which is fixed to a lock casing $n$ by screw $o$. The lock casing $n$ is fixed, for example to a door, by screws $s$.

When a suitable serrated key $k$, provided with an engagement tooth $w$, is inserted into the lock (Fig. 4) the tooth $w$ engages the slot $r$ in the flange of the socket and the balls $c$ are moved outwardly forcing the axially movable members $b$ to move to the new position and compress the spring $d$. The teeth $e$ of the axially movable members $b$ register with the radial slots $h$ in the sleeve $p$. The slots $h$ are so dimensioned that the teeth $e$ can easily pass along them and allow the socket $a$ to be turned, and unlock the lock. The length of each slot $h$ is adequate to allow the necessary turn of the socket $a$ to unlock the lock (Fig. 4a). If all the teeth $e$ are properly positioned relative to the radial slots $h$ of the sleeve $p$ the teeth will enter the slots $h$ and allow the socket $a$ to be opened by turning the key $k$ (Figs. 3a and 4a) and consequently the lock bolt will be operated and the lock unlocked.

When the key $k$ is withdrawn from the lock all axially movable members $b$ and balls $c$ are pushed by the spring $d$ to the position (Fig. 3) wherein the socket $a$ cannot be turned and consequently the lock is locked.

Only the first ball position is determined by the locking piece $l$ as when the key $k$ is pressed in and the first ball of the series of balls $c$ rises all movable members $b$ together with the remaining balls $c$ of the series are pushed towards the spring. As each ball $c$ is moved radially by the key $k$ as well, each of the balls $c$ will push additionally its following members. Finally the position of the last ball $c$ (nearest to the spring $d$) will differ in the locked from the unlocked position by the sum of all upward movements of all preceding balls by tangent $\alpha/2$, if $\alpha$ is the angle of the cone of the axially movable member.

Each axially movable member $b$ has an axial movement which is a function of the radial movement of all preceding balls $c$, having as a first ball the ball which rides on the face of a fixed locking piece.

The ball $c$ presses directly on the slope of the relative wedge-shaped member $b$ and therefore the key $k$ cannot be inserted or withdrawn when the projection $e$ on the wedge is in a recess $h$, and can only be inserted or withdrawn when the projection $e$ is not in a recess $h$ but is in the groove $g$.

The projections of a number of cones, of course, enables a large number of separate combinations to be made and since each individual ball on moving outwardly moves all the wedge-like members of which the slopes are directed towards the balls, the motion imparted by a plurality of balls is cumulative.

Instead of balls rollers $c^1$ may be employed as radially movable members, as illustrated in Figs. 6 and 6a in conjunction with wedge-like members $b^1$ in socket $a^1$.

As illustrated in Figs. 7 and 7a levers $c^2$ pivoted to suitably recessed blocks $b^2$ may be employed in conjunction with press blocks $b^3$ spring pressed at $d^2$ in socket $a^2$.

In socket $a$ the slot $f$ prevents the axially movable members $b$ from being positioned one by one opposite the annular slots $h$ in the sleeve $p$ and then being driven into the slots $h$ by using special tools. Only a correctly serrated key can accomplish this.

As illustrated in Figs. 8 and 8a in sleeve $p^1$ radial slots $h^1$ may be cut on both sides of the longitudinal slot $g^1$ of the sleeve $p^1$.

As illustrated in Figs. 9 and 9a in sleeve $p^2$ radial slots $h^2$ may be cut on both sides of the longitudinal slot $g^2$, each side for a different key.

As illustrated in Figs. 10 and 10a in sleeve $p^3$ radial slots $h^3$, $h^4$, $h^5$ may be cut in such a way relative to the longitudinal slot $g^3$ that to complete the unlocking turn it will be necessary to use several keys, for instance where it is desirable that more than one key shall be necessary to open the lock of a safe.

The number of axially and/or radially movable members may be other than four.

It will be seen that details of the construction may be varied in many ways without departing from the scope of the invention.

What I claim and desire to secure by Letters Patent is:

1. A lock comprising in combination, a sleeve member formed with a longitudinal slot and at least one arcuate peripheral slot connected therewith, at least one axially movable member in said sleeve, a projection on said axially movable member adapted operatively to engage with said slot arrangement in said sleeve member, at least one radially movable member positioned in operative relationship relative to said axially movable member, and means whereby on the insertion of a key of suitable profile the radial movable member moves outwardly to cause axial movement of the axially movable member to bring the said projection into register with the said arcuate slot on said sleeve member to allow the rotation of said axially movable member.

2. A lock comprising in combination a rotatable sleeve, a longitudinal and peripheral slot arrangement in said sleeve, a plurality of coaxial annuli in said sleeve, an internal sloped recess in each annulus, at least one radially movable member in said sloped recess, a peripheral projection on said annulus engaging in the longitudinal slot of the sleeve member, and means in said recess whereby said annulus is moved axially by a radial movement of said radially movable member in said sloped recess on insertion of a key of suitable profile.

3. A lock comprising in combination a rotatable sleeve, a circumferential and longitudinal slot arrangement in said sleeve, a plurality of coaxial rotatable annuli slidable within said sleeve with internal coaxial sloped recesses, and projection means between said sleeve and said annuli for engaging selectively in said slot arrangement and balls in said recesses, and means whereby on the insertion of a key of suitable profile the radially movable balls are moved radially to move the axially movable members in an axial direction to unlock the lock.

4. A lock comprising in combination a rotatable sleeve, axially movable members within said sleeve, a longitudinal peripheral slot arrangement in said sleeve, sloped recesses within said axially movable members, radially movable cylindrical members within said recesses, and means whereby on the insertion of a key of suitable profile the radially movable cylindrical members are moved radially to move the axially movable members in an axial direction to unlock the lock.

5. A lock comprising in combination a rotatable sleeve member, a longitudinal and peripheral slot arrangement in said rotatable sleeve member, at least one axially movable member in said rotatable sleeve, a recess in said axially movable member, at least one radially movable lever pivoted on said axially movable member in said recess, and means whereby on insertion of a suitably shaped key to unlock the lock, said radially movable lever moves said axially movable member.

6. A lock comprising in combination, a rotatable sleeve member formed with a longitudinal slot and at least one arcuate peripheral slot on each side connected therewith, at least one axially movable member in said sleeve, a projection on said axially movable member adapted operatively to engage with said slots in said sleeve member, at least one radially movable member positioned in operative relationship relative to said axially movable member, and means whereby on the insertion of a key of suitable profile the radial movable member moves outwardly to cause axial movement of the axially movable member to bring the said projection into register with the said arcuate slot on said sleeve member to allow the rotation of said axially movable member.

7. A lock comprising in combination, a rotatable sleeve member formed with a longitudinal slot and at least one arcuate peripheral slot on each side connected therewith, the slot being of different sizes and being so shaped that plurality of different keys are required for opening the lock, at least one axially movable member in said sleeve, a projection on said axially movable member adapted operatively to engage with said slots in said sleeve member, at least on radially movable member positioned in operative relationship relative to said axially movable member, and means whereby on the insertion of a key of suitable profile the radial movable member moves outwardly to cause axial movement of the axially movable member to bring the said projection into register with the said arcuate slot on said sleeve member to allow the rotation of said axially movable member.

8. A lock comprising in combination a rotatable cylindrical sleeve, axial and peripheral slots in said sleeve, axially movable members in said sleeve, recesses in said axially movable members, radially movable members in said recesses, spring means in said sleeve opposing axial separation of said axially movable members and means whereby on the insertion of a key of suitable profile the radial movable members are moved outwardly to force the axially movable members in axial direction against spring pressure from the locked to the unlocked position of the lock.

LUDWIK SEWERYN BIALKOWSKI.

REFERENCES CITED

The following references are of record in the file of this patent:

UNITED STATES PATENTS

| Number | Name | Date |
| --- | --- | --- |
| 925,761 | Dunn | June 22, 1909 |
| 1,234,212 | Renaux | July 24, 1917 |